United States Patent [19]
Brändli

[11] Patent Number: 4,759,421

[45] Date of Patent: Jul. 26, 1988

[54] INDUSTRIAL VEHICLE WITH INTEGRATED EMERGENCY RECOVERY DEVICE

[75] Inventor: Max Brändli, Safnern, Switzerland

[73] Assignee: JD-Technologie AG, Zug, Switzerland

[21] Appl. No.: 919,644

[22] Filed: Oct. 16, 1986

[30] Foreign Application Priority Data

Oct. 25, 1985 [CH] Switzerland ........................ 04603/85

[51] Int. Cl.[4] ................................................ B62D 1/24

[52] U.S. Cl. ...................................... 180/168; 180/8.1; 180/8.3; 180/23; 180/24.02; 180/209; 280/43.23

[58] Field of Search ...................... 180/168, 24.02, 209, 180/8.1, 8.3, 22, 23, 24; 280/43.13, 43.23

[56] References Cited

U.S. PATENT DOCUMENTS

| | | | |
|---|---|---|---|
| 2,985,251 | 5/1961 | Tellier | 180/24 |
| 3,096,995 | 7/1963 | Richnow, Jr. | 180/43.23 X |
| 3,299,978 | 1/1967 | Sponsler | 180/24.02 X |
| 3,404,746 | 10/1968 | Slay | 180/23 |
| 3,414,072 | 12/1968 | Hodges, Jr. et al. | 180/43.23 |
| 3,841,503 | 10/1974 | Hollenbach | 214/75 R |
| 4,344,498 | 8/1982 | Lindfors | 180/168 |
| 4,392,541 | 7/1983 | Barchard | 180/209 |

FOREIGN PATENT DOCUMENTS

| | | | |
|---|---|---|---|
| 0030111 | 6/1981 | European Pat. Off. . | |
| 0041176 | 12/1981 | European Pat. Off. . | |
| 558528 | 9/1932 | Fed. Rep. of Germany . | |
| 620857 | 10/1935 | Fed. Rep. of Germany . | |
| 2144786 | 3/1973 | Fed. Rep. of Germany . | |
| 2437208 | 2/1976 | Fed. Rep. of Germany . | |
| 2843205 | 4/1979 | Fed. Rep. of Germany . | |
| 3342933 | 6/1985 | Fed. Rep. of Germany . | |
| 750688 | 8/1933 | France | 180/24 |
| 2152551 | 4/1973 | France . | |
| 2192520 | 2/1974 | France . | |
| 2281263 | 3/1976 | France . | |
| 2449578 | 10/1980 | France | 180/168 |
| 1272338 | 4/1972 | United Kingdom . | |

*Primary Examiner*—David M. Mitchell
*Assistant Examiner*—Tamara L. Finlay
*Attorney, Agent, or Firm*—Werner W. Kleeman

[57] ABSTRACT

The industrial truck or vehicle comprises a support body or member supporting an elevatable platform. The support body is supported and guided on both ends by a respective transverse pivot joint of a respective driving module or unit. The width of the support body and the platform is narrower than the width of the two driving units. This narrowing or reduction in width of the industrial vehicle ensures that the complete platform region on both longitudinal sides of the industrial vehicle is manually accessible despite providing good lateral vehicle stability. Furthermore, the torsional elasticity of the support body is increased such that the support body in combination with the transverse pivot joints provide sufficient travel surface adhesion or floor traction of all drive wheels and support or free-running wheels even over irregular or uneven travel surfaces. The industrial vehicle possesses an emergency recovery device so that it can be temporarily driven without auxiliary devices if up to two wheels become blocked. For this purpose the driving units are tilted individually or in combination about the still functional wheels by means of a respective drive spindle until the blocked wheels are free of the floor or ground surface and the industrial vehicle is rendered mobile. The reduction in width of the industrial vehicle and the autonomous capability of recovering from emergencies permits this industrial vehicle to be utilized in flexibly-organized assembly plants, especially in the automotive industry.

26 Claims, 3 Drawing Sheets

Fig. 3III

INDUSTRIAL VEHICLE WITH INTEGRATED EMERGENCY RECOVERY DEVICE

CROSS REFERENCE TO RELATED CASE

This application is related to the commonly assigned, co-pending U.S. application Ser. No. 06/789,627, filed Oct. 21, 1985, now U.S. Pat. No. 4,690,422, entitled "JOINT FOR A TRANSVERSELY SEPARATED VEHICLE", and listing as the inventors Max Brandli and Hansueli Feldmann.

BACKGROUND OF THE INVENTION

The present invention broadly relates to an industrial truck or vehicle and, more specifically, pertains to a new and improved construction of an industrial truck or transport vehicle with an integrated emergency recovering device.

Generally speaking, the industrial truck or transport vehicle of the present invention has an integrated emergency recovery device and is especially designed for automatic steering or guidance along a guide line or path. This industrial truck or vehicle with an integrated emergency recovery device comprises a support body or member containing an elevatable platform. Each end of this support body or member is supported and guided by a respective driving module or unit. Each respective drive unit possesses a steerable and brakeable drive wheel and self-steering, free-running support or caster or follower wheels which trail or are subsequent to the associated drive wheel as seen in an appropriate direction of vehicle travel. The industrial truck or vehicle furthermore contains devices for receiving, processing and transmitting signals relative to a stationary device which transmits and receives these signals along the travel path or surface for controlling the industrial truck or transport vehicle.

In other words, the industrial truck or transport vehicle of the present invention is preferably for automatically following a guide line or path and comprises a support body. The support body has a first end and has a second end and is provided with an elevatable platform. The industrial truck or transport vehicle also comprises a first drive module for supporting and guiding the support body at the first end as well as a second drive module for supporting and guiding the support body at the second end. Each drive module of the first drive module and the second drive module has at least one steerable and brakeable drive wheel and at least two self-steering follower or support wheels.

Such industrial trucks or vehicles are generally employed for the integration of automatic transportation and warehousing technology in flexible production and assembly systems, for example during the assembly of units in the automobile and electronic industries and during the production of a broad range of products.

An industrial truck or vehicle, in particular a lateral lifting truck or vehicle with an elevatable load carrier, is known from the German Patent Publication No. 2,144,786, published Mar. 15, 1973, for traveling in the aisles between shelves or partitions and for depositing or stacking and removing or unstacking articles, goods or wares. This industrial truck or vehicle comprises two individual vehicle portions or modules connected by means of an elevatable load carrier. Each of these individual vehicle portions or modules possesses a guide mast. One of these individual vehicle portions or modules comprises a drive motor and an operator location or area. A special or supplementary transverse connection between both individual vehicle portions or modules is thus not necessary. The connection between the elevatable load carrier and the guide masts is accomplished by means of rollers which lie with their axes approximately transverse to a connecting line between the individual vehicle portions or modules and corresponding rails. Lateral stops or stop limits are provided for the load carrier. Appropriate double roller and center rails are used for connection between the guide masts and the load carrier to permit minimum possible play between the individual vehicle portions. The load carrier is constructed in a telescopic manner, wherein each telescoping part is particularly constructed and associated as a connecting member.

Even though with the aforesaid construction of the industrial truck or vehicle no tipping moment results from the load in the direction of travel, this industrial truck or vehicle nevertheless has the disadvantage that when encountering uneven or irregular travel paths the travel surface adhesion or floor traction of at least one of the drive wheels can be diminished, especially of the steerable drive wheel. The freedom of motion in the vertical direction existing between both individual vehicle portions or modules of the industrial truck or vehicle for overcoming unlevel or uneven sections of the floor or travel surface is structurally complex and tends to jam in consequence of uneven wearing of the drive wheels and of the free-running support wheels, or because of surface irregularities, especially skewed irregularities, in particular with a fully extended load carrier.

Furthermore, both individual vehicle portions of the industrial truck or vehicle are solely connected by means of the elevatable load carrier. Thus, there is no possibility of harmonizing the frame construction of fabrication of the industrial truck or vehicle such that, on the one hand, the frame construction is sufficiently rigid or inflexible with respect to the desired tilting stability and, on the other hand, is elastically deformable to the extent that all rollers and wheels are provided with constant contact with the floor or travel surface.

It has also proven disadvantageous that the aforementioned industrial truck or vehicle does not possess an integrated emergency recovery device. Thus, if this industrial truck or vehicle incurs a blocked drive wheel, it can only be removed from the aisles between the shelves or partitions with the assistance of an emergency recovery vehicle especially provided therefor. The use of this industrial truck or vehicle is accordingly limited to those applications in which the unhindered access of an emergency recovery vehicle is continuously guaranteed. Most applications in flexible assembly plants and production systems are thus precluded, since for architectural or constructional reasons an emergency recovery device or vehicle cannot be brought into these areas to the industrial truck or vehicle quickly enough or indeed at all. For this reason, complete autonomy of the industrial truck or vehicle is required with respect to emergency recovery.

SUMMARY OF THE INVENTION

Therefore, with the foregoing in mind, it is a primary object of the present invention to provide a new and improved construction of an industrial truck or vehicle with an integrated emergency recovery device which does not exhibit the aforementioned drawbacks and shortcomings of the prior art constructions.

Another and more specific object of the present invention aims at providing a new and improved construction of an industrial truck or vehicle with an integrated emergency recovery device and of the previously mentioned type in which the track or lateral wheel spacing determining the lateral stability as well as the width of the elevatable platform are determinable independently of one another.

A further significant object of the present invention aims at providing a new and improved construction of an industrial truck or vehicle with an integrated emergency recovery device and of the previously mentioned type in which all free-running or support wheels during normal travel possess sufficient travel surface adhesion independent of travel surface irregularities. If defective, these support wheels, individually or in combination with one another, can be completely raised from the travel surface or floor for emergency recovery of the industrial truck or vehicle.

Yet a further significant object of the present invention aims at providing a new and improved construction of an industrial truck or vehicle with an integrated emergency recovery device and of the character described and which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the industrial truck or vehicle with an integrated emergency recovery device of the present invention is manifested by the features that the support body or member possesses a lesser width than the width of both driving modules or units and that each driving module or unit is articulated by means of a respective easily detachable transverse joint. The support body or member and the driving modules or units are interconnected by means of respective spindle drives. Each spindle drive has an extended position, a retracted position and an intermediate position or -range of positions between the extended position and the retracted position. The driving modules or units are individually, when required, each deflected relative to the support body or member from their neutral or center position by a first predetermined angle or first predetermined maximum deflection when the associated spindle drive is in its extended position and are individually, when required, each deflected relative to the support body or member by a second predetermined angle or a second predetermined angle of maximum deflection when the associated spindle drive is in its retracted position. When the associated spindle drive is in its intermediate position or neutral or center position, both driving modules or units are automatically deflectable in the region or range between the first predetermined angle or maximum deflection and the second predetermined angle or maximum deflection.

In other words, the industrial vehicle of the present invention is manifested by the features that the support body is provided with first transverse pivot means at the first end for pivotably engaging the first drive module and with second transverse pivot means at the second end for pivotably engaging the second drive module. The first drive module comprises first spindle actuator means for extensably and retractably connecting in a direction extending transverse to the first transverse pivot means the first drive module to the first end of the support body. The second drive module comprises second spindle actuator means for extensibly and retractably connecting in a direction extending transverse to the second transverse pivot means the second drive module to the second end of the support body.

BRIEF DESCRIPTION OF THE DRAWINGS

The invention will be better understood and objects other than those set forth above, will become apparent when consideration is given to the following detailed description thereof. Such description makes reference to the annexed drawings wherein.

Figure 3I:
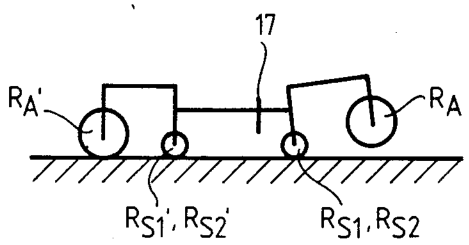
Figure 3I:
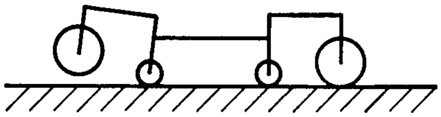
Figure 3I:
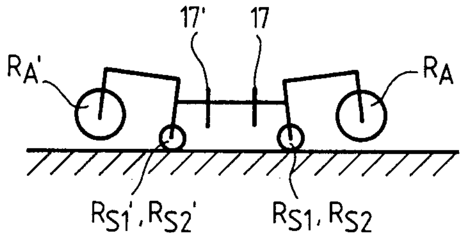
Figure 3I:
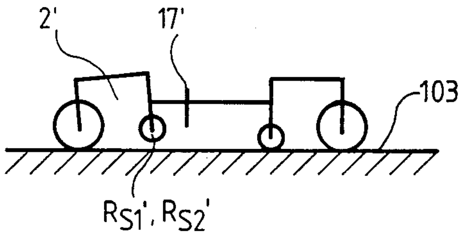
Figure 3V:
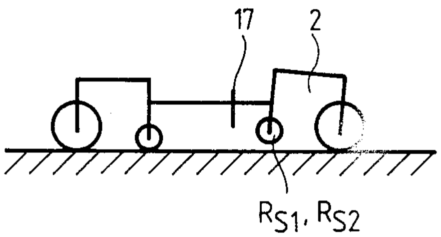

FIG. *2a* is a schematic partial section of an exemplary embodiment of the industrial truck or vehicle showing in particular the emergency recovery device wherein the extendable and retractable spindle is in the center or middle position;

FIG. *2b* is a schematic partial section according to FIG. *2a* showing the extendable and retractable spindle in the retractable position;

FIG. *2c* is a schematic partial section according to FIG. *2a* showing the extendable and retractable spindle in the extendable position; and FIGS. 3I through 3V are schematic diagrams of possible emergency conditions and showing the corresponding emergency recovery measures.

DETAILED DESCRIPTION OF THE PREFERRED EMBODIMENTS

Describing now the drawings, it is to be understood that to simplify the showing thereof only enough of the structure of the industrial vehicle with an integrated emergency recovery device has been illustrated therein as is needed to enable one skilled in the art to readily understand the underlying principles and concepts of this invention.

The invention will be described hereinafter with reference to a drivable working platform as used in flexibly-organized assembly plants. Nevertheless, the herein illustrated and described principles are generally applicable to all similar vehicles in the field of automatic transportation and warehousing technology, for example for the reliable retrieval of stored articles or goods and for the transportation of pallets within the delivery and pick-up region as well as for the connection of warehousing and machine centers in flexibly-organized production systems.

Figure 1:
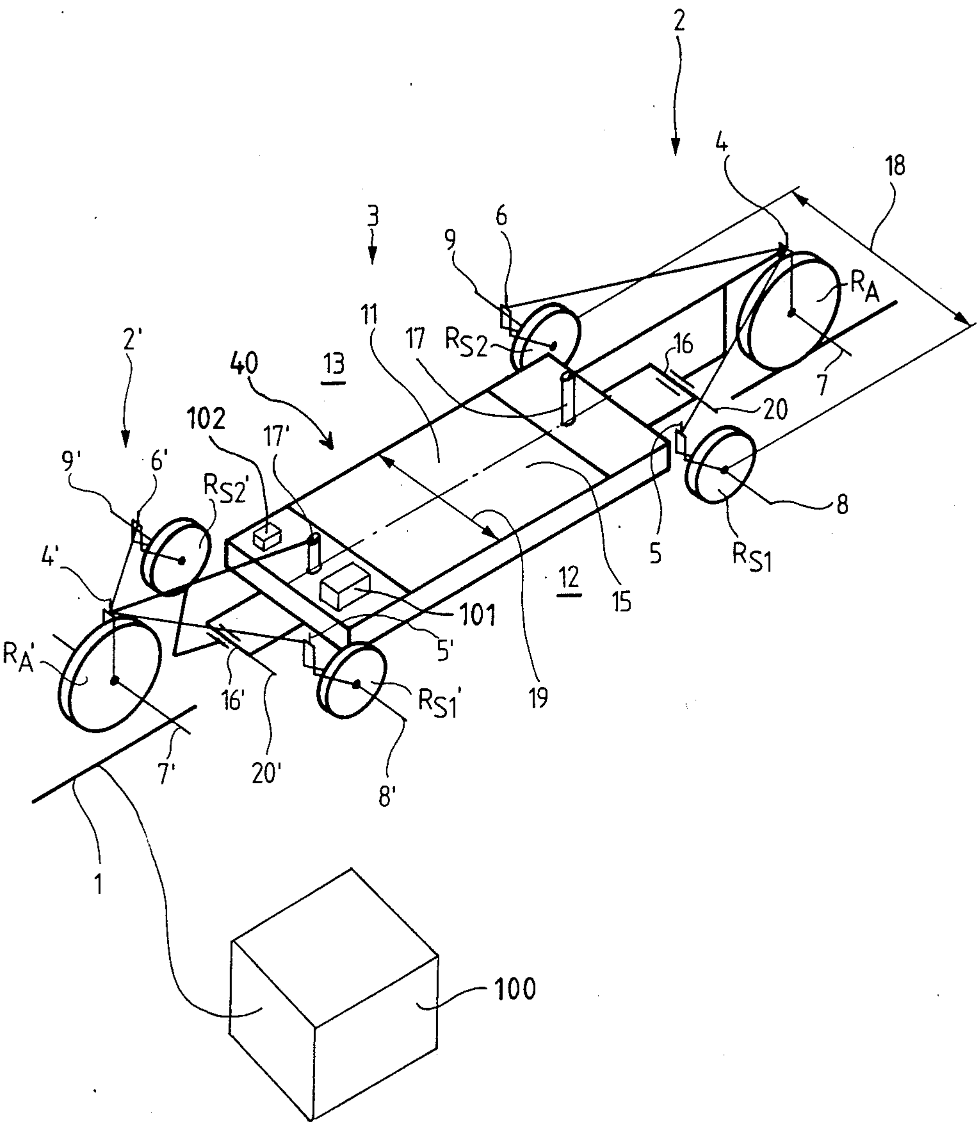
FIG. 1 is a schematic diagram in perspective view of the industrial truck or vehicle with an integrated emergency recovery device exhibiting a narrowing or reduction in width of the support body or member and the platform which is less than the width of the driving modules or units.

Turning now specifically to FIG. 1 of the drawings, the apparatus illustrated therein by way of example and not limitation will be seen to comprise an exemplary embodiment of an industrial truck or vehicle 40 according to the invention which is intended for automatic or self-steering along a track or guide line or path 1. The guide line or path 1 may be connected to or otherwise operatively associated with a control device 100 for receiving and transmitting signals via the guide line or path 1 for controlling the industrial truck or transport vehicle 40. The industrial truck or vehicle 40 comprises two separate driving modules or units 2 and 2' which are both connected symmetrically in mirror-image relationship to a load-carrying support body or member 3. Each driving module or unit 2 and 2' essentially comprises a respective steerable and brakeable drive wheel $R_A$ and $R_A'$ possessing a drive and steering servo and two respective free-running follower or support wheels $R_{S1}$, $R_{S2}$ and $R_{S1}'$, $R_{S2}'$ which trail or are subsequent to the associated drive wheel as seen in the appropriate direction of travel. Each driving module or unit 2 and 2' also comprises safety devices 102 and a microprocessor 101 for controlling and monitoring the travel speed and the steering angle and which are only schematically shown in FIG. 1. The microprocessor or control processor 101 may receive signals from and transmit signals to the control device 100 via the guide line or path 1.

All three wheels of each of the driving modules or drive units 2 and 2' are pivotable about respective steering axes 4, 5, 6 and 4', 5', 6'. These steering axes 4, 5, 6 and 4', 5', 6' are substantially vertically disposed and are mounted on the underside or bottom side of the industrial truck or vehicle 40 in not particularly shown associated wheel bearing mountings or suspension units. The respective steering axes 4, 5, 6 and 4', 5', 6' of the driving modules or units 2 and 2' are mutually spaced from one another. The steering axes 4 and 4' extend through respective pivot axes 7 and 7' of the associated drive wheels $R_A$ and $R_A'$. The respective pairs of support wheels $R_{S1}$, $R_{S2}$ and $R_{S1}'$, $R_{S2}'$ are self-steering about their respective steering axes 5, 6 and 5', 6' which are at a distance from respective pivot axes 8, 9 and 8', 9'. The drive wheels $R_A$ and $R_A'$ are pivotable by means of a suitable motor and a not particularly shown steering and driving control unit about the associated steering axes 4 and 4' and are drivable by means of a further suitable motor or means about the respective pivot axes 7 and 7'.

The support body or member 3 which is supported and guided by the two driving modules or units 2 and 2' comprises an elevatable platform 11 which is accessible from both longitudinal sides 12 and 13 of the industrial truck or vehicle 40. This support body or member 3 can be utilized, for example, as an assembly platform which is displaceable along an assembly line for the assembly of automotive vehicles. The load carrying support body 3 has a inherent torsional flexibility which, in conjunction with the pivoting motion of the driving modules or units 2 and 2', enables the drive wheels $R_A$ and $R_A'$ as well as the follower or support wheels $R_{S1}$ and $R_{S2}$ and $R_{S1}'$ and $R_{S2}'$ to maintain tractive adhesion with a travel surface 103 even if the travel surface 103 is irregular or uneven. The support body 3 has a maximum width 19 chosen such that the full region or extent of the elevatable platform 11 is manually accessible from the two longitudinal sides of the industrial truck or transport vehicle 40. The elevatable platform 11 has substantially the same width 19 as the support body 3 but also could be essentially equal thereto.

The connection of both drive modules or units 2 and 2' with the support body or member 3 is accomplished at both ends by means of respective transverse pivot joints 16 and 16', which are disposed substantially transverse to a longitudinal center axis 15 of the industrial truck or vehicle 40 and with respective spindles or drive spindles 17 and 17' extendable and retractable in a direction transverse to the pivot joints 16 and 16' which will be further explained hereinbelow in reference to FIGS. *2a, 2b* and *2c*. The transverse pivot joints 16 and 16' may be defined as virtual pivot joints, for instance by curved tracks or by four-bar linkage means.

Both transverse pivot joints 16 and 16' are situated in the lower region of the industrial truck or vehicle 40 between the drive wheel $R_A$ and the associated pair of support wheels $R_{S1}$, $R_{S2}$ and between the drive wheel $R_A'$ and its associated pair of supported wheels $R_{S1}'$, $R_{S2}'$. The width dimensions as measured in a direction transverse to the longitudinal center axis 15 of the industrial truck or vehicle 40 of the two drive units 2 and 2' and the support body or member 3 are indicated with the reference numerals 18 and 19, respectively. The width 18 of the drive or modules or units 2 and 2' determines the largest possible track width. The track width determines the lateral stability of the industrial truck or transport vehicle 40 and must be sufficient to guarantee lateral stability at the maximum attainable travel speed with the elevatable platform in its elevated position.

In the exemplary embodiment shown in FIG. 1 and as previously discussed, the elevatable platform 11 and the support body or member 3 are substantially of the same width and are both narrower than the widths of both driving units 2 and 2'. The narrowing or reduction in width of the industrial truck or vehicle 40 resulting thereby is a substantial and significant characteristic of the present invention.

The driving units 2 and 2' are deflectable with respect to the support body or member 3 independently of one another in both directions of rotation or deflection about associated respective axes 20 and 20' of the transverse pivot joints 16 and 16'. The deflection or tilting of both driving units 2 and 2' about the respective transverse pivot joints 16 and 16' serves for the emergency recovery of the industrial truck or vehicle 40, for example during blockage of the respective drive wheels $R_A$ and $R_A'$ and the respective free-running support wheels $R_{S1}$, $R_{S2}$ and $R_{S1}'$, $R_{S2}'$. This tilting or deflection action is more fully described hereinbelow in reference to FIGS. *2a, 2b* and *2c*.

In FIG. *2a* one end of the industrial truck or vehicle which possesses the driving module or unit 2 is shown in the normal driving or traveling position, thus the emergency recovery device is not activated or engaged. The emergency recovery device comprises two substantially rectangular hollow or tubular sections 23 and 24 which are mutually congruent and are vertically displaceable relative to one another and without rotation. The square or rectangular tubular section 23 which engages a not particularly shown spindle nut is fixedly connected with the driving unit 2 at the side thereof adjacent the support body or member 3. The square or rectangular tubular section 24 connected with the extendable and retractable spindle 17 can come to rest with its resilient limiting stops or stop limits 25 and 26 at a knuckle or hitch 27 defining a contact member of the support body or member 3. In FIG. *2a* the extendable and retractable spindle 17 is in a center or middle position so that an upper play region 28 and a lower play region 29 exists between the respective stop or stop limits 25 and 26 and the knuckle or hitch 27. The resilient limiting stop 25 contacts the knuckle or hitch 27 in an extended position of the spindle actuator 17 and the tubular section 24, while the resilient limiting stop 26 contacts the knuckle or hitch 27 in a retracted position thereof.

FIGS. *2b* and *2c* illustrate the industrial truck or vehicle 40 in an emergency recovery position with the emergency recovery device activated in both examples.

Figure 2A:
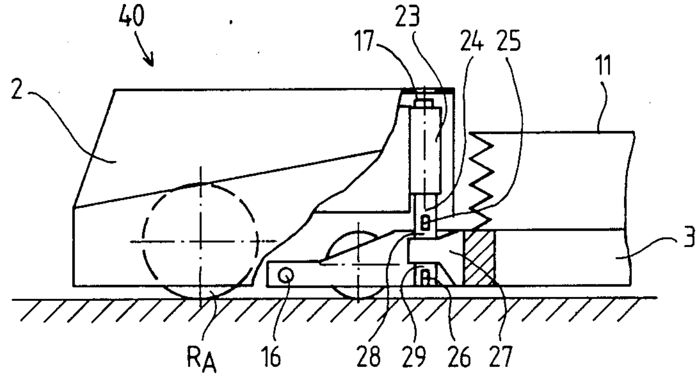
Figure 2B:
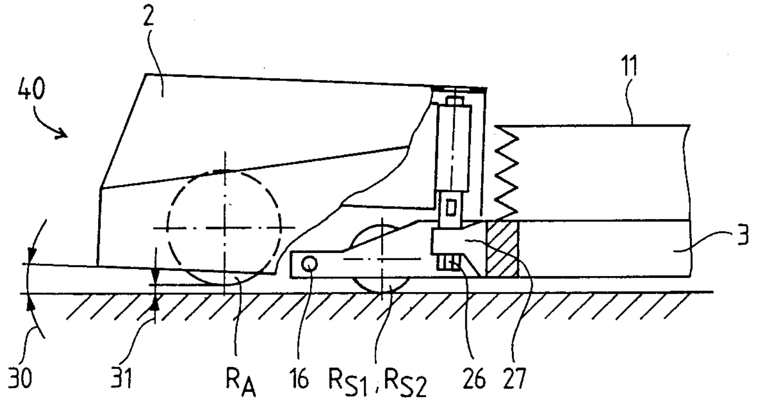

In FIG. 2*b* the extendable and retractable spindle 17 is in the retractable or retracted position so that the stop or stop limit 26 comes to rest on the knuckle or hitch 27. In this position the driving unit 2 is deflected or displaced from its center or neutral position in a clockwise direction about the transverse pivot joint 16 towards the support body or member 3 and tilted on the free-running or support wheels $R_{S1}$, $R_{S2}$ by an angle 30 relative to the travel path. By this means the drive wheel $R_A$ is raised from the floor or travel surface 103 by a distance 31.

Figure 2C:
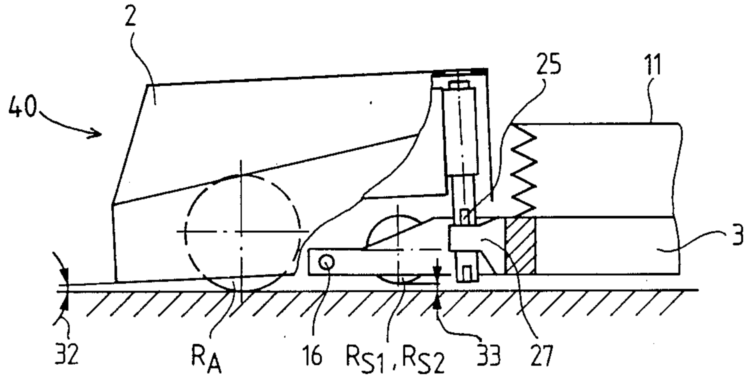

FIG. 2*c* illustrates the extendable and retractable spindle 17 in the extended position. Thus the stop or the stop limit 25 rests upon the knuckle or hitch 27. In this instance the driving unit 2 is deflected or displaced from its center or neutral position in a counter-clockwise direction about the transverse pivot joint 16 relative to the support body or member 3 and thereby tilted on the drive wheel $R_A$ by an angle 32 measured relative to the travel surface or path. Both free-running follower or support wheels $R_{S1}$ and $R_{S2}$ are thus raised from the floor or travel surface by a distance 33.

There are five emergency situations illustrated in FIGS. 3I, 3II, 3III, 3IV and 3V, respectively, which would result from defective or blocked drive wheels $R_A$ and $R_A'$ or free-running support wheels $R_{S1}$, $R_{S2}$, $R_{S1}'$ and $R_{S2}'$. In the cases of the emergencies shown in FIGS. 3I and 3III, the respective drive wheel $R_A$ and $R_A'$ is blocked. In both instances the respective blocked drive wheel $R_A$ and $R_A'$ is raised from the travel surface or floor by means of the emergency recovery device. It is then possible to drive the industrial truck or vehicle 40 under motor power on the pairs of free-running or support wheels $R_{S1}$, $R_{S2}$ and $R_{S1}'$, $R_{S2}'$ and the respective functional or operable drive wheel $R_A'$ or $R_A$.

The emergency shown in FIG. 3III illustrates the situation in which both drive wheels $R_A$ and $R_A'$ are simultaneously blocked, for example during failure of the set of batteries for the drive means of the industrial truck or vehicle 40. To recover from this emergency, both drive wheels $R_A$ and $R_A'$ are simultaneoulsy raised from the floor or travel surface or ground 103 using the respective associated extendable and retractable spindles 17 and 17'. In this manner the industrial truck or vehicle 40 can be manually driven in any desired direction on the pairs of free-running or support wheels $R_{S1}$, $R_{S2}$ and $R_{S1}'$, $R_{S2}'$.

In the emergencies shown in FIGS. 3IV and 3V it is the two pairs of free-running or support wheels $R_{S1}'$, $R_{S2}'$ and $R_{S1}$, $R_{S2}$ which are raised as pairs respectively by the respective drive modules or units 2' and 2 from the travel surface or floor 103. In both such emergencies the industrial truck or vehicle 40 can be driven away under motor power with the respective functional or operatable driving module or unit 2 and 2' and on the respective driving wheel $R_A$ or $R_A'$ of the respective defective drive module or unit 2 or 2', but with reduced lateral stability.

While there are shown and described present preferred embodiments of the invention, it is to be distinctly understood that the invention is not limited thereto, but may be otherwise variously embodied and practiced within the scope of the following claims.

What I claim is:

1. An industrial transport vehicle having integrated emergency recovery means and automatically guided along a guide path, comprising:

a support member comprising an elevatable platform and having a first end and a second end;

a respective drive unit for supporting and guiding said support member at each of said first end and said second end;

said support member and each said respective drive unit respectively constituting interconnected but separate structures;

each said drive unit comprising:

a steerable and brakeable drive wheel; and self-steering support wheels;

a respective transverse pivot joint for articulating said support member to each said respective drive unit;

a respective extendable and retractable spindle interconnecting said support member and each said respective drive unit;

each said extendable and retractable spindle having an extended position, a retracted position and an intermediate position therebetween;

each said respective drive unit being deflected relative to said support member by a first predetermined angle when an associated spindle of said extendable and retractable spindles is in said retracted position thereof and by a second predetermined angle when said associated spindle is in said extended position; and each said respective drive unit being deflectable within a region between said first predetermined angle and said second predetermined angle when said associated spindle is in said intermediate position thereof.

2. The industrial vehicle as defined in claim 1, further including:

means for automatically guiding the industrial vehicle along the guide path.

3. The industrial vehicle as defined in claim 1, wherein:

said industrial vehicle has a dynamic lateral stability;

said each respective drive unit has a predetermined first width; and said predetermined first width of each said respective drive unit being dimensioned such that the dynamic lateral stability of the industrial vehicle is provided throughout all positions of the elevatable platform.

4. The industrial vehicle as defined in claim 3, wherein:

said support member possesses torsional elasticity;

said industrial vehicle has a pair of oppositely situated longitudinal sides;

said elevatable platform has a complete region; and said support member has a predetermined width such that the complete region of said elevatable platform is manually accessible from both longitudinal sides of the industrial vehicle and the torsional elasticity of said support member required for sufficient floor traction of said drive wheels and said support wheels is assured.

5. The industrial vehicle as defined in claim 4, wherein:

said elevatable platform has a predetermined width;

said predetermined width of said support member and said predetermined width of said elevatable platform are substantially the same.

6. The industrial vehicle as defined in claim 4, wherein:

sufficient floor traction of both said drive wheels and all said support wheels is provided by the deflection of each said drive unit relative to said support member in the region between said first predetermined angle and said second predetermined angle and by the torsional elasticity of said support member.

7. The industrial vehicle as defined in claim 4, wherein:

sufficient floor traction of both said drive wheels and all said support wheels is provided by the deflection of each said drive unit relative to said support member in the region between said first predetermined angle and said second predetermined angle and by the torsional elasticity of said support member even over irregular travel paths.

8. The industrial vehicle as defined in claim 1, wherein:

each said transverse pivot joint for articulating said support member to each said respective drive unit has an axis;

each said drive wheel of each said respective drive unit having a pivot axis;

each said self-steering support wheel of each said respective drive unit having a pivot axis; and said axis of each said transverse pivot joint being located between said pivot axis of the drive wheel of the respective drive unit articulated with said support member by said transverse pivot joint and each said pivot axis of the self-steering support wheels of said respective drive unit.

9. The industrial vehicle as defined in claim 1, wherein:

the industrial vehicle has a center longitudinal axis;

each said transverse pivot joint being disposed substantially transverse to said center longitudinal axis of the industrial vehicle; and each said transverse pivot joint defining a virtual pivot joint.

10. The industrial vehicle as defined in claim 1, further including:

stop limits provided for each respective extendable and retractable spindle interconnecting said support member and each said respective drive unit;

each said transverse pivot joint having a first predetermined maximum deflection and a second predetermined maximum deflection;

each one of said drive units coming to rest on an associated one of said stop limits in said respective first predetermined maximum deflection of the respective transverse pivot joint cooperating with the drive unit; and each one of said drive units coming to rest on another associated one of said stop limits in said respective second predetermined maximum deflection of the respective transverse pivot joint cooperating with the drive unit.

11. The industrial vehicle as defined in claim 10, wherein:

said first and second predetermined maximum deflections are determined such that complete clearance from the travel path results with substantially flat travel paths for said drive wheels and said support wheels.

12. The industrial transport vehicle as defined in claim 1, further including:

a stationary device; and means for receiving, processing and transmitting signals relative to said stationary device which transmits and receives these signals along the guide path for controlling the industrial vehicle.

13. The industrial transport vehicle as defined in claim 1, wherein:

said support member possesses a lesser width than each said respective drive unit.

14. The industrial transport vehicle as defined in claim 1, wherein:

each said respective transverse pivot joint defines an easily detachable transverse pivot joint.

15. An industrial transport vehicle for automatically following a guide path, comprising:

a support body having a first end and a second end and provided with an elevatable platform;

a first drive module for supporting and guiding said support body at said first end and a second drive module for supporting and guiding said support body at said second end;

each said first drive module, said support body and said second drive module respectively constituting successively interconnected but separate structures;

each drive module of said first drive module and said second drive module having at least one steerable and brakeable drive wheel and at least two self-steering follower wheels;

said support body being provided with first transverse pivot means at said first end for pivotably engaging said first drive module and with second transverse pivot means at said second end for pivotably engaging said second drive module; and said first drive module comprising first spindle actuator means for extensibly and retractably connecting in a direction extending transverse to said first transverse pivot means said first drive module to said first end of said support body and said second drive module comprising second spindle actuator means for extensibly and retractably connecting in a direction extending transverse to said second transverse pivot means said second drive module to said second end of said support body.

16. The industrial transport vehicle as defined in claim 15, wherein:

each said first and second spindle actuator means comprises a spindle actuator;

each spindle actuator of said first spindle actuator means and said second spindle actuator means has a respective retracted position, a respective extended position and a respective range of positions therebetween;

said first spindle actuator means being arranged to connect said first drive module to said first end of said support body such that when said first spindle actuator is in said retracted position said first drive module is pivoted about said first transverse pivot means for raising its associated at least one steerable and brakeable drive wheel relative to both said first end of said support body and said at least two self-steering follower wheels and such that when said first spindle actuator means is in said extended position said first drive module is pivoted about said first transverse pivot means for depressing said at least one steerable and brakeable drive wheel relative to both said first end of said support body and said at least two self-steering follower wheels;

said second spindle actuator means being arranged to connect said second drive module to said second end of said support body such that when said second spindle actuator is in said retracted position said second drive module is pivoted about said second transverse pivot means for raising its associated at least one steerable and brakeable drive wheel relative to both said second end of said support body and said at least two self-steering follower wheels and such that when said second spindle actuator is in said extended position said second drive module is pivoted about said second transverse pivot means for depressing said at least one steerable and brakeable drive wheel relative to both said second end of said support body and said at least two self-steering follower wheels;

said first spindle actuator means being arranged to connect said first drive module to said first end of said support body such that when said first spindle actuator is in said range of positions between said retracted position and said extended position said first drive module is free to perform pivoting motions about said first transverse pivot means; and said second spindle actuator means being arranged to connect said second drive module to said second end of said support body such that when said second spindle actuator is in said range of positions between said retracted position and said extended position said second drive module is free to perform pivoting motions about said second transverse pivot means.

, 17. The industrial transport vehicle as defined in claim 16, wherein:

said at least one steerable and brakeable drive wheel and said at least two self-steering follower wheels of each drive module conjointly define a requisite tractive adhesion for said at least one steerable and brakeable drive wheel and said at least two self-steering follower wheels;

said support body has a predetermined torsional flexibility;

said predetermined torsional flexibility and said ranges of positions between said extended positions and said retracted positions of said first and second spindle actuators which permit said first and second drive modules to perform said pivoting motions conjointly providing said requisite tractive adhesion even on irregular travel surfaces.

18. The industrial transport vehicle as defined in claim 15, further including:

signal-processing means for receiving, processing and transmitting signals carried by the guide path for control of the industrial transport vehicle.

19. The industrial transport vehicle as defined in claim 18, wherein:

said signal-processing means receive, process and transmit said signals carried by the guide path relative to a control device for transferring said signals to and from the guide path.

20. The industrial transport vehicle as defined in claim 15, wherein:

said industrial vehicle has a dynamic lateral stability;

said elevatable platform has an elevated position;

the industrial transport vehicle having a maximum attainable travel speed;

said at least two self-steering follower wheels of each drive module being spaced apart by a predetermined track dimension; and said predetermined track dimension of said first and second drive modules being sufficiently great that the dynamic lateral stability of the industrial transport vehicle is ensured with said elevatable platform in said elevated position and the industrial transport vehicle travelling at said maximum attainable travel speed.

21. The industrial transport vehicle as defined in claim 15, wherein:

said support body defines a maximum width;

said elevatable platform defining a predeterminate width;

the industrial transport vehicle having two longitudinal sides;

said maximum width of said support body being sufficiently narrow that said predeterminate width of said elevatable platform is manually accessible from said two longitudinal sides;

said at least one steerable and brakeable drive wheel and said at least two self-steering follower wheels of each said drive module conjointly defining a requisite torsional flexibility of said support body for ensuring adequate tractive adhesion of said at least one steerable and brakeable drive wheel and of said at least two self-steering follower wheels of each said drive module; and said maximum width of said support body being dimensioned such that said requisite torsional flexibility prevails.

22. The industrial transport vehicle as defined in claim 21, wherein:

said maximum width of said support body and said predeterminate width of said elevatable platform being substantially equal.

23. The industrial transport vehicle as defined in claim 15, wherein:

each transverse pivot means of said first transverse pivot means and said second transverse pivot means defines a transverse pivot axis;

each said at least one steerable and brakeable drive wheel having a first axis of rotation;

said at least two self-steering follower wheels having a second axis of rotation;

the industrial transport vehicle having a longitudinal direction of extent; and each said transverse pivot axis being disposed between said first axis of rotation and said second axis of rotation as viewed in said longitudinal direction.

24. The industrial transport vehicle as defined in claiam 15, wherein:

said first transverse pivot means and said second transverse pivot means each comprise a virtual pivot means.

25. The industrial transport vehicle as defined in claim 15, wherein:

said first drive module is provided with a first resilient limiting stop member and a second resilient limiting stop member and said second drive module is provided with a first resilient limiting stop member and a second resilient limiting stop member;

said first end of said support body being provided with contact means for engaging said first resilient limiting stop member when said at least one steerable and brakeable drive wheel is raised;

said contact means of said first end of said support body engaging said second resilient stop member when said at least one steerable and brakeable drive wheel is depressed;

said second end of said support body being provided with contact means for engaging said first resilient limiting stop member when said at least one steerable and brakeable drive wheel is raised; and said contact means of said second end of said support body engaging said second resilient stop member when said at least one steerable and brakeable drive unit is depressed.

26. The industrial transport vehicle as defined in claim 25, wherein:

said first resilient limiting stop member of said first drive module cooperates with said contact means of said first end of said support body and said first resilient limiting stop member of said second drive module cooperates with said contact means of said second end of said support body such that when both said at least one steerable and brakeable drive wheels are raised each of said steerable and brakeable drive wheels are completely removed from a travel surface; and said second resilient limiting stop member of said first drive module cooperating with said contact means of said first end of said support body and said second resilient limiting stop member of said second drive module cooperating with said contact means of said second end of said support body such that when both each of said at least one steerable and brakeable drive wheels are depressed said at least two self-steering follower wheels are completely removed from said travel surface.

* * * * *